United States Patent
Nijim et al.

(10) Patent No.: US 9,569,624 B1
(45) Date of Patent: Feb. 14, 2017

(54) RECORDING THIRD PARTY CONTENT TO A PRIMARY SERVICE PROVIDER DIGITAL VIDEO RECORDER OR OTHER STORAGE MEDIUM

(71) Applicant: Cox Communications, Inc., Atlanta, GA (US)

(72) Inventors: Yousef Wasef Nijim, Roswell, GA (US); Len Barlik, Atlanta, GA (US); Jay Paul Langa, Cumming, GA (US); James Alan Strothmann, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 77 days.

(21) Appl. No.: 13/831,821

(22) Filed: Mar. 15, 2013

(51) Int. Cl.
*H04N 5/91* (2006.01)
*G06F 21/60* (2013.01)
*H04N 5/76* (2006.01)

(52) U.S. Cl.
CPC .................................. *G06F 21/60* (2013.01)

(58) Field of Classification Search
CPC .... G06F 21/10; G06F 21/60; H04N 21/25891; H04N 21/4147; H04N 21/6547; H04N 21/4334; H04N 21/4335; H04N 21/47214
USPC ..... 726/26, 27; 386/297; 725/32, 39, 46, 50, 725/53; 707/706
See application file for complete search history.

(56) References Cited

U.S. PATENT DOCUMENTS

| 2011/0311206 A1* | 12/2011 | Hubner et al. ................. 386/297 |
| 2012/0079529 A1* | 3/2012 | Harris et al. ..................... 725/32 |
| 2012/0110044 A1* | 5/2012 | Nagpal ............. G06F 17/30575 707/827 |

\* cited by examiner

*Primary Examiner* — Kambiz Zand
*Assistant Examiner* — Noura Zoubair
(74) *Attorney, Agent, or Firm* — Merchant & Gould

(57) ABSTRACT

Recording of third party content on recording systems of a primary service provider is provided. Third party service providers may provide information about offered video content to a primary content service provider. The primary service provider may allow its customers/subscribers to access the third party content through the systems of the primary service provider. Upon navigation to a desired third party content item, a customer/subscriber may request a recording of the third party content. The third party content may be passed to the primary service provider for recording on one or more storage systems associated with the primary service provider, and the recorded content may subsequently be played back by the customer/subscriber in the same manner as play back of content recorded from the primary service provider.

20 Claims, 7 Drawing Sheets

RECORDING THIRD PARTY CONTENT TO A PRIMARY SERVICE PROVIDER DIGITAL VIDEO RECORDER OR OTHER STORAGE MEDIUM

BACKGROUND

With the advent of video distribution systems, it has become possible to deliver video content over Internet protocol (IP) to a variety of devices such as IP set-top boxes and associated television systems, mobile devices (telephones, tablet computers, laptop computers, etc.), smart televisions, and the like. In a typical setting, a content service provider, such as a cable television provider or other television content service provider, may provide such content for consumption by a customer/subscriber including allowing the customer/subscriber to record content to one or more storage systems for future playback.

Oftentimes, third party service providers allow customers/subscribers of a primary service provider to access third party content via the systems of the primary service provider. For example, a cable television service provider may allow its customers/subscribers to access and consume content from a third party news service, sports entertainment service or video service through the systems of the cable television service provider by providing the customer/subscriber links to the content of the third party service provider such that selection of the links allows the customer/subscriber to access the third party content from the primary service provider systems. A significant drawback to such third party content access, however, is an inability of the customer/subscriber to record the third party content for future playback.

It is with respect to these and other considerations that the present invention has been made.

SUMMARY

Embodiments of the present invention solve the above and other problems by providing recording of third party content on recording systems of a primary service provider through which a customer/subscriber accesses third party content.

According to embodiments, third party service providers may provide information about video content to a primary content service provider. The information may include metadata that identifies and describes various features and attributes of the content and that provides links to the content of the third party service provider. The primary service provider may allow its customers/subscribers to access the third party content through the systems of the primary service provider. Upon navigation to a desired third party content item, a customer/subscriber may request a recording of the third party content. The third party content may be passed to the primary service provider for recording on one or more storage systems associated with the primary service provider, and the recorded content may subsequently be played back by the customer/subscriber in the same manner as play back of content recorded from the primary service provider.

The details of one or more embodiments are set forth in the accompanying drawings and description set out below. Other features and advantages will be apparent from a reading of the following detail description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout the several figures.

DETAILED DESCRIPTION

As briefly described above, embodiments of the present invention are directed to recording third party content on recording systems of a primary service provider through which a customer/subscriber accesses third party content. Third party service providers, for example, news services, sports entertainment services, website operators, or any other third party video content provider, may provide information about video content to a primary content service provider, for example, a cable television service provider. The information may include metadata that identifies and describes various features and attributes of the content and that provides links to the content of the third party service provider. The primary service provider may populate a programming guide with information about its programming, and it may use the content information received from third parties to populate the programming guide with information about available third party content. Upon selection of a third party content item from the programming guide, the customer/subscriber may navigate to the third party content for consuming the desired content.

According to embodiments, the customer/subscriber may select a recording function associated with the third party content, and the third party content may be passed to the primary service provider for recording on one or more storage systems associated with the primary service provider. The recorded content may then be listed along with other recorded content, and the recorded content may be played back to the customer/subscriber at a future date/time in the same manner as the customer/subscriber would do if the content had been provided by the primary service provider.

Figure 1:
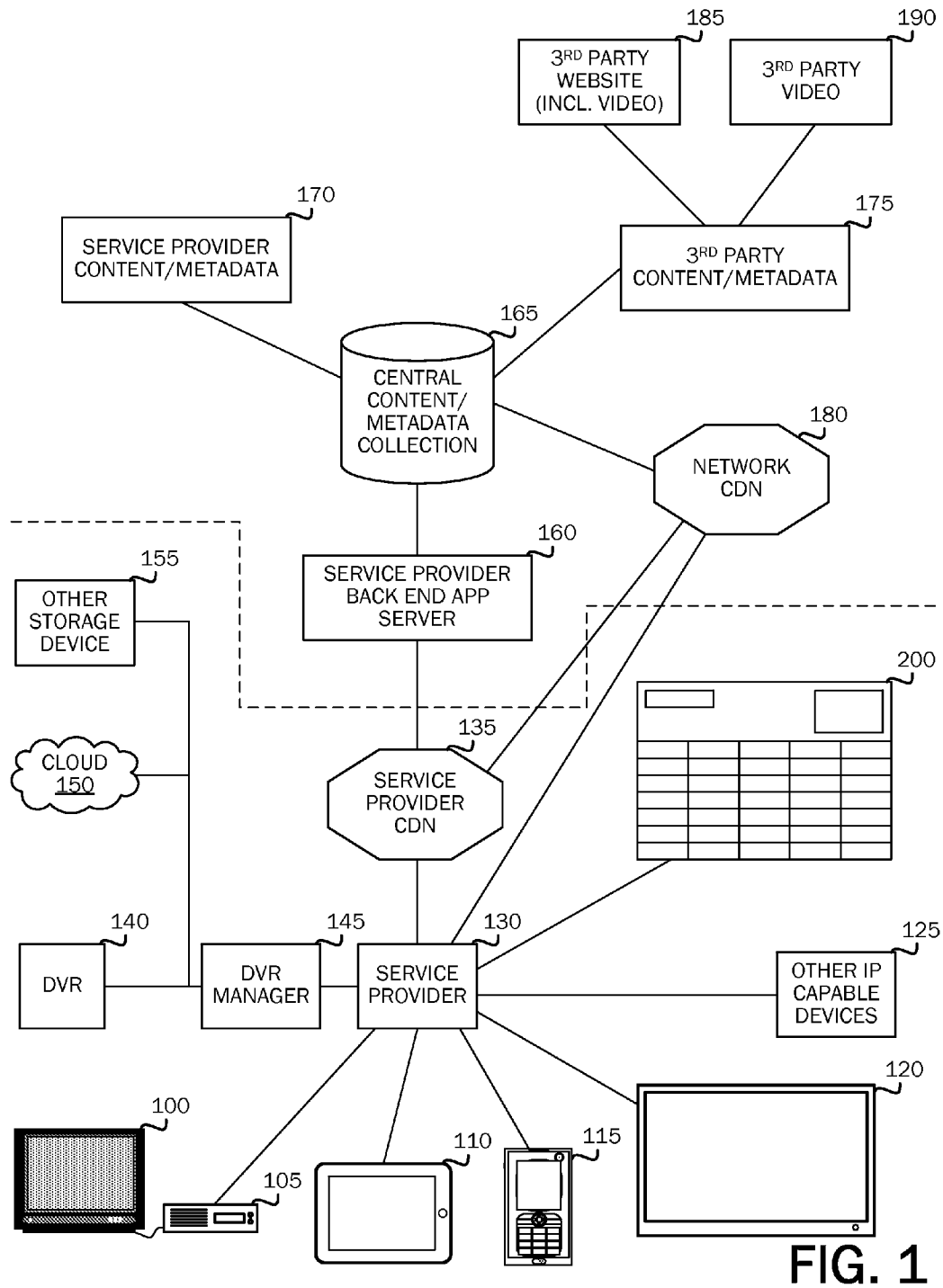
FIG. 1 is a simplified block diagram of an exemplary system for accessing and recording third party content via a primary service provider.

FIG. 1 is a simplified block diagram of an exemplary system for accessing and recording third party content via a primary service provider. Referring to the lower portion of FIG. 1, a primary service provider 130 is illustrated for providing a variety of content to customers/subscribers via one or more receiver devices. The service provider 130 is illustrative of any service provider, for example, a cable television service provider, a satellite-based television service provider, an Internet protocol-based service provider, or any other service provider that is operable for providing audio, video, or a combination of audio and video content to customers/subscribers for consumption via a variety of receiving devices. A detailed illustration and description of an example cable television services provider system is provided below with reference to FIG. 7.

Receiving devices include any device capable of receiving audio and video content and for allowing consumption of the content. For example, a television 100 and associated set-top box 105 is illustrated, a tablet computing device 110 is illustrated, a mobile telephone 115 is illustrated, a smart television 120 is illustrated and other (IP) capable devices 125 are illustrated. As will be described below, each of these types of devices may be used for accessing and consuming third party content via a primary service provider and for requesting recording of third party content to one or more storage locations.

A service provider content delivery network (CDN) 135 is illustrated in association with the service provider 130 and a service provider back end and application server 160 are illustrated in association with a service provider CDN. As should be appreciated, the layout of the functionalities of the service provider including the service provider CDN and the service provider back end and application server system are for purposes of illustration only and are not restrictive of the various layouts and combinations of systems that may be utilized by a given service provider for providing content to customers/subscribers.

According to embodiments, a service provider back end/application server may provide functionality for maintaining profile information on customers/subscribers including permissions for customers/subscribers to utilize service provider functionality including consumption of service provider content and including such functionalities as parental control systems, billing systems, and the like. The back end and application server for the service provider may provide operating functionality, for example, one or more software applications and associated databases for directing content distribution provided by the service provider 130 to customers/subscribers at the receiving devices 100, 110, 115, 120, 125.

The service provider content delivery network (CDN) 135 is illustrative of a delivery or distribution network which may include a distributed system of servers, databases, and other content repositories for distributing audio and video content, text, graphics, media files, software applications and associated documents, on-demand content, social media content, live streaming media content, and the like from the service provider 130 to the customers/subscribers. CDNs typically function by receiving requests from clients, checking a local cache for a copy of the requested resource, or querying some source if a requested resource is not in the cache or has expired for example. CDN servers can be strategically located at the edges of various networks to limit loads on network interconnects and backbones. CDN servers can be redundantly deployed and interact with other CDN servers to respond to content requests from clients in attempts to optimize content delivery. For example, network edge servers can enable ease of browsing, navigating and streaming of content, including streaming live video. For example, if a given customer/subscriber operating the tablet computing device 110 selects a news story for live streaming to the tablet computing device 110 as offered by the service provider 130, the application server at the back end application server may cause a media player to activate for streaming the desired content from the service provider CDN 135 to the customers' tablet computing device 110 via IP-based transmission to the tablet computing device 110.

A programming guide 200 is illustrated with which the service provider 130 may provide information about one or more features or attributes of available programming. As will be described with reference to FIG. 2 below, the programming guide 200 may be displayed on any of the content receiving devices 100, 110, 115, 120, 125 for allowing customers/subscribers to review information about available programming provided by the service provider 130 and for allowing customers/subscribers to select available programming for viewing. As will be described herein, in addition to programming provided by the service provider 130, the programming guide 200 may be populated with information identifying and describing third party content, and the customer/subscriber may utilize the programming guide 200 for navigating to and consuming the third party content.

A digital video recording (DVR) manager 145 is illustrated in association with the service provider 130 and includes hardware and software functionality operative to manage recording of service provider content to one or more storage systems including the digital video recording system (DVR) 140, the cloud-based storage system 150, or other storage devices 155. As should be appreciated, the DVR system 140 is illustrative of a local system associated with a receiving device, for example, a DVR functionality and storage medium contained in a set-top box 105, or the DVR system 140 may be illustrative of digital video recording functionality and memory capacity maintained in one of the other receiving devices, for example, the tablet computing device 110, the telephone 115, the smart television 120, or any other receiving device 125 capable of operating a digital video recording function and associated storage media. The cloud-based storage system 150 is illustrative of storage functionality and storage media maintained and operated remotely from the one or more receiving devices, for example, as part of a server farm accessible by the service provider via an appropriate data transmission protocol for example, Internet protocol. The other storage systems 155 are illustrative of any other storage medium to which recorded content may be passed for storage and from which recorded content may be extracted for playback 100, 110, 115, 120, 125 via the service provider 130.

Referring now to the upper portion of FIG. 1, interaction between one or more third party content providers with the primary service provider 130 is illustrated. A central content/metadata collection point 165 is illustrated for receiving and storing content and metadata describing features and attributes of content from the primary service provider 130. The service provider content/metadata 170 is illustrative of content and associated descriptive metadata maintained and provided by the primary service provider 130, and information associated with that content including descriptive metadata may be passed to the central content/metadata collection point 165 for use in distributing the content and associated metadata through the back end application server of the service provider 130 via the service provider CDN 135, as described above. As should be appreciated, metadata associated with content may include information such as content titles, content authors, content creation date, content ratings, information describing content plots, summaries, or any other information that may be provided in association with a given content item. In addition to metadata associated with a given content item, for example, a movie, television show, news event, sports event, and the like, additional metadata for the content item may be produced and provided by the service provider, for example, information relating to viewing times, viewing channels, and the like designated by the service provider 130.

On the upper right portion of FIG. 1, a variety of third party content and metadata 175, 185, 190 is illustrated for provision to customers/subscribers of the primary service provider 130 as described herein. For example, the third party content/metadata 175 may be illustrative of content provided by one or more third party service providers, for example, other television services providers, content distribution providers, and the like. The third party website 185 is illustrative of any number of Internet-based websites from which content may be streamed to a customer/subscriber of a primary service provider 130, as described herein. The third party video 190 is illustrative of any provider or repository of video content from which video may be streamed to customers/subscribers of the service provider 130, as described herein. For example, the third party content/metadata 175 may be content provided by a secondary service provider, for example, a secondary television services provider separate from the primary service provider 130. The secondary television provider may have content, for example, news content, sports entertainment content, movies, television shows, and the like that may be accessed by customers/subscribers of the primary service provider 130 for viewing. For example, a secondary service provider may have a contractual relationship with the primary service provider for allowing customers/subscribers of the primary service provider to access content provided by the secondary service provider for distribution, as described herein. The third party website 185 may be illustrative of any of numerous websites provided by news services, sports services, entertainment services, and the like and from which content may be streamed to customers/subscribers of the primary service provider 130. The third party video 190 may be illustrative of any service or system from which any of a variety of video content items may be offered for customers/subscribers of the primary service provider 130 for access and viewing.

According to embodiments, the providers of video via the third party systems 175, 185, 190 may provide information that identifies and describes their various content offerings, for example, metadata associated with content offerings that describe the titles, content item source, plots, summaries, authors, actors, creation dates, ratings, and the like. Such information may be provided by the third party content providers to the primary service provider via the central content/metadata collection point 165. In addition, information provided by the third party service providers for content items may include information, such as uniform resource locators (URL), for allowing the content items to be located and retrieved for consumption by requesting customers/subscribers. The primary service provider may extract information from the central content/metadata collection point 165 for identifying and describing available content and for populating information about available content in a programming guide 200.

The actual content, for example, video content, may be passed to customers/subscribers of the primary service provider 130 via one or more third party content delivery networks (CDN) 180. Thus, information, including metadata associated with individual content items, may be stored and analyzed via the central content/metadata collection point 165 and may be mated with the desired content which may be passed from the third party CDN 180 to the primary service provider CDN 135 for ultimate distribution to the customers/subscribers of the service provider 130. In addition, as illustrated in FIG. 1, the primary service provider 130 may access the third party CDN 180 directly for content and data as authorized by an operating relationship between the primary service provider 130 and one or more third party content and data providers.

According to an embodiment, when metadata is received in association with a given content item from one or more third party content providers 175, 185, 190, the back end application server may be operative to analyze the data received and stored at the central content/metadata collection point 165 for use in association with the systems of the primary service provider 130 and for enhancement as desired by the primary service provider 130. For example, information identifying one or more content items provided by the third party content providers 175, 185, 190 may be used by the primary service provider 130 for correlating the third party data with data maintained by the primary service provider for its content. For example, correlating data received from third party service providers with data maintained by the primary service provider may allow the primary service provider to determine whether a given piece of third party content is already available from the primary service provider. That is, if a customer/subscriber of the primary service provider 130 desires to view a particular television show provided by a third party video provider 190, analysis of metadata associated with the content item may allow the primary service provider 130 to know that the same or matching content item is available from the primary service provider 130 such that the primary service provider 130 may provide the content item to its customer/subscriber without the need for streaming the content item from the third party content provider.

In addition, metadata associated with third party content items may be used in association with information from the primary service provider for enhancing content offerings. For example, metadata associated with a third party content item that will be used for populating a programming guide 200 may be supplemented with information from the primary service provider 130 such as viewing times, ratings applied to the content item, and the like.

Figure 2:
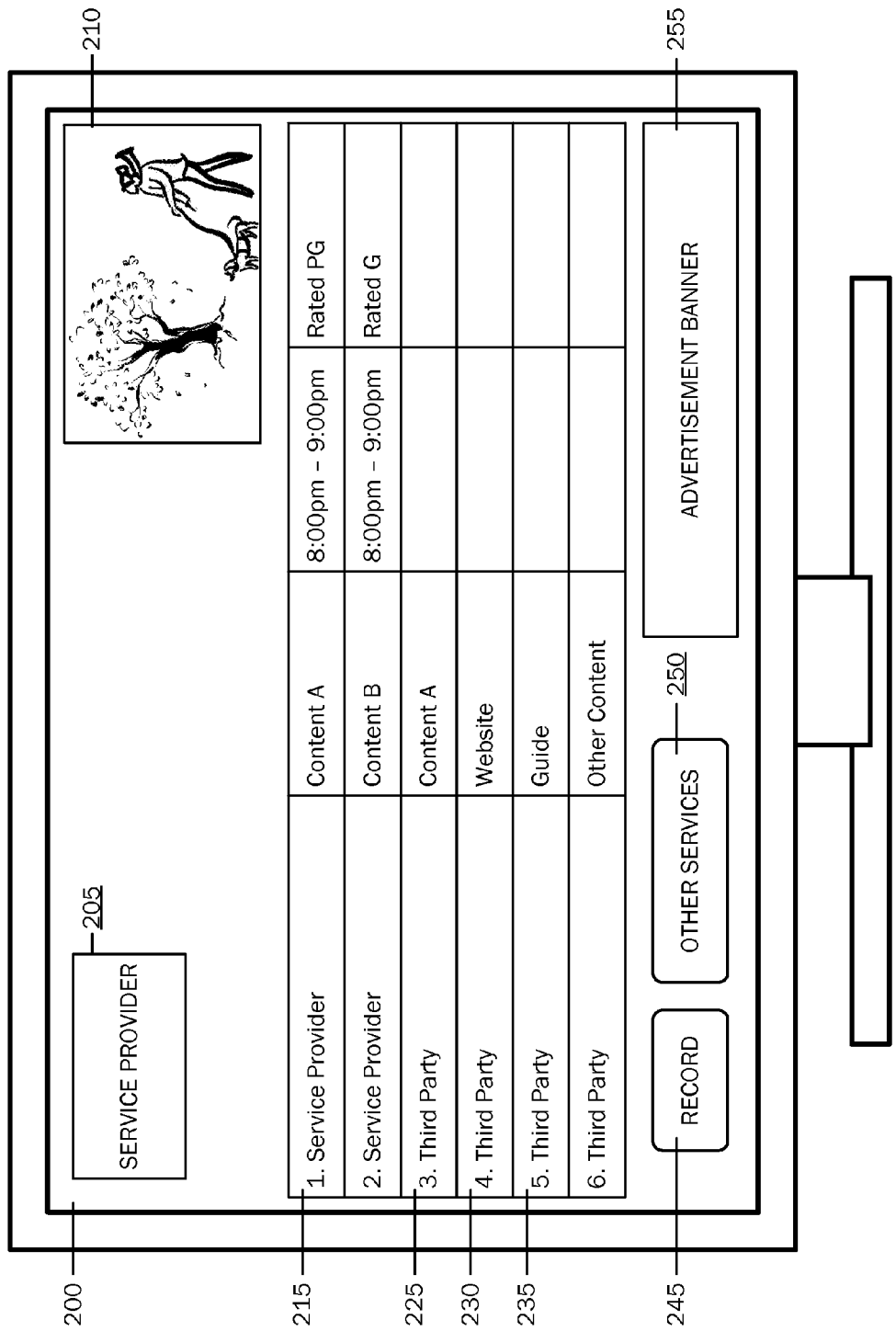
FIG. 2 is a simplified block diagram illustrating a programming guide for providing information about one or more available content items.

FIG. 2 is a simplified block diagram illustrating a programming guide, often referred to as an electronic programming guide (EPG), for providing information about one or more available content items. As briefly described above, the primary service provider 130 may provide a programming guide 200 for providing information about video programming that may be selected for viewing by customers/subscribers of the primary service provider 130. According to an embodiment, the programming guide 200 is a user interface that may be used for a variety of purposes including the provision of information about available programming, the provision of content, and the provision of selectable functionalities for use in association with one or more content items. Referring to the programming guide 200, a service provider logo 205 is illustrated for identifying the programming guide with respect to the primary service provider 130.

A content viewing tile 210 is illustrated for providing content in association with a given viewing channel. For example, the content viewing tile 210 may be used for showing content associated with a presently selected viewing channel while information regarding other content items available on other channels is displayed beneath to allow a user to navigate available content offerings while continuing to watch a selected content channel. As should be appreciated, the service provider logo 205 and the content viewing tile 210 are for purposes of example only and are not restrictive of the many types of information and numbers of such information that may be provided in the programming guide 200.

A number of viewing channels 1-6 are illustrated in a matrix of content information that may provide a customer/subscriber with information about content items that may be selected for viewing in association with each channel. As described above with reference to FIG. 1, the primary service provider 130 may generate and collect metadata in association with each content item and may generate a content description for each content item for inclusion in the programming guide 200. For example, referring to the first channel row 215, the service provider, for example, Cox Communications, may be provided followed by a title for the content item, for example, "content A" followed by other information, for example, a time at which the content item will be broadcast, streamed or otherwise made available to customers/subscribers followed by other information, for example, a movie or television rating applied to the content item, and the like. As should be appreciated, the example information illustrated for each content item illustrated in the programming guide 200 is for purposes of example only and is not restrictive of the numerous types of information that may be assembled and displayed in association with each content item.

Referring still to FIG. 2, a third content item row 225 is illustrated showing a content item provided by a third party service provider. For example, the third party service provider may be a third party video service provider having a contractual relationship with the primary service provider for providing specialized content for example, old black and white movies. The fourth channel row 230 illustrated in the programming guide 200 also contains information from a third party service provider, for example, information from a third party website. For example, the fourth channel associated with the third party website may allow a customer/subscriber to select this channel for viewing video streamed from a third party website to a customer/subscriber of the primary service provider as described above with reference to FIG. 1.

The fifth channel row 235 shows example information associated with a third party programming guide. For example, a third party video services provider 190, illustrated above with respect to FIG. 1, may have numerous video offerings that may be available to a customer/subscriber of the primary service provider, and selection of the fifth channel row 235 illustrated in the programming guide 200 may allow the customer/subscriber to receive a new video guide provided by the third party video services provider that may overlay the video guide 200 illustrated in FIG. 2 for providing similar information and selectable channels associated with the third party video services provider 190. As should be appreciated, such a video guide may be displayed over the presently displayed video guide 200, or the selected video guide may be displayed as a picture-in-picture where the new video guide is displayed in a portion of the display space illustrated in FIG. 2, or the two video guides may be displayed in above and below orientation relative to each other, right-to-left orientation relative to each other, and the like.

As described above with reference to FIG. 1, the information populating the content channel rows illustrated FIG. 2 may be obtained from the various third party service providers and may be assembled and analyzed at the central content/metadata collection point 165. In addition to displaying information provided by the third party service providers, the primary service provider may add additional information such as viewing times, ratings, descriptive information, and the like. Once information is obtained and analyzed for each third party offering, appropriate descriptive information may be generated for populating in the programming guide.

Beneath the display of content item offerings are illustrated a variety of functionality buttons, controls, text boxes and the like. For example, a record button 245 is illustrated for allowing a user to selectively record a content item that is presently running, or to allow the user to selectively record a content item that is scheduled to run at a future time. The other services button 250 is illustrative of a functionality control associated with other functionalities and services a customer/subscriber may select in association with various content items. The advertisement banner 255 is illustrative of a text box or other zone within the programming guide 200 for providing useful, helpful or other interesting information to customers/subscribers. As should be appreciated, the layout, content, information, and functionalities illustrated in the example programming guide 200 are for purposes of example only and are not restrictive of the vast numbers of content items and layouts that may be utilized for the user interface with which a customer/subscriber may interact with and receive information from a service provider 130.

Figure 3:
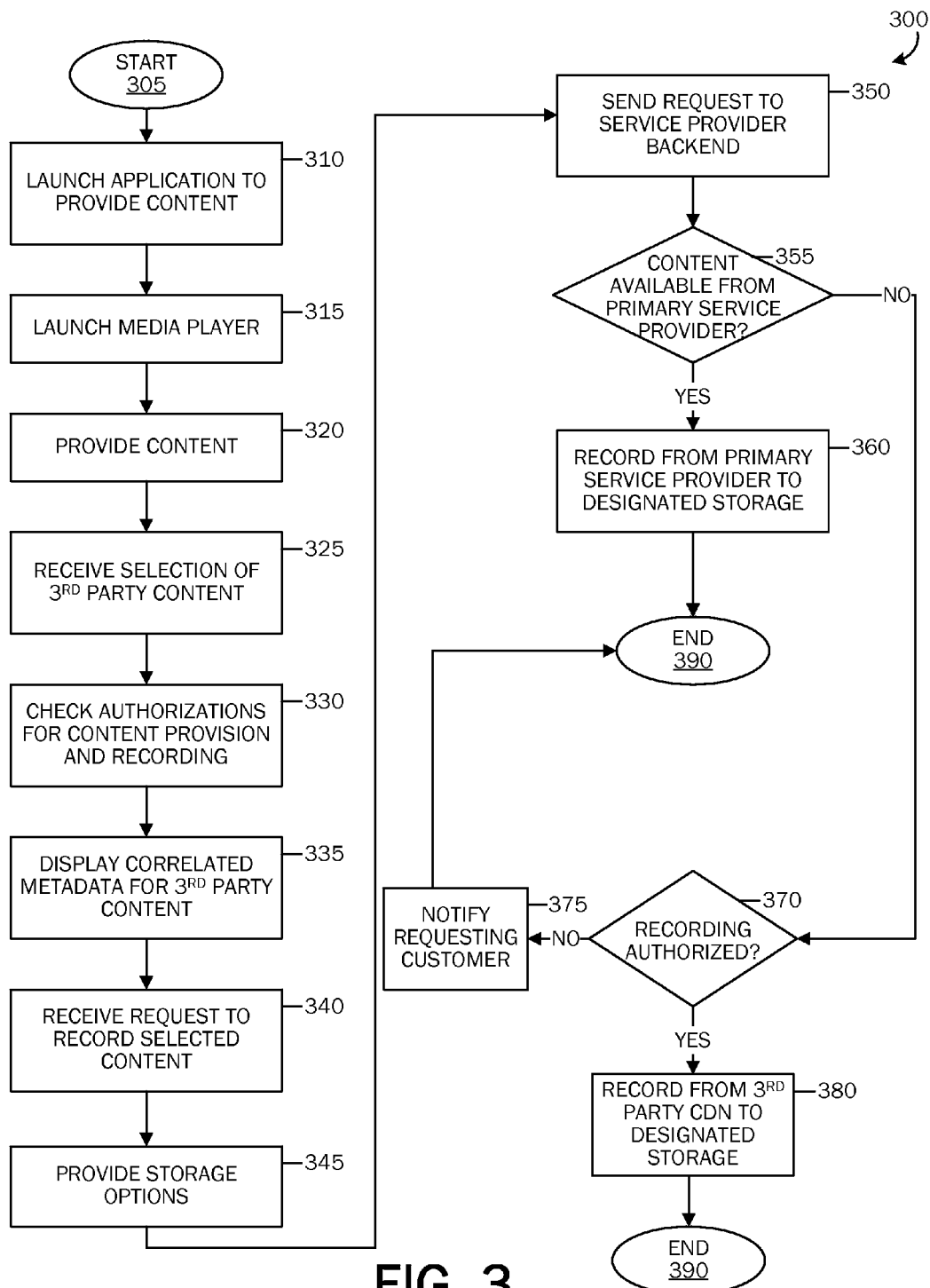
FIG. 3 is a flowchart illustrating a method for accessing and recording third party content via a primary service provider.

Having described an exemplary operating environment and an example programming guide with reference to FIGS. 1 and 2, FIG. 3 is a flowchart illustrating a method for accessing and recording third party content via a primary service provider. The method 300 begins at start operation 305 and proceeds to operation 310 where the back end application server of the primary service provider 130 launches an application to provide content for viewing, recording or other consumption in response to a customer/subscriber request. For example, launching an application to provide content may be the result of the selection of a particular content channel provided in the programming guide 200, illustrated in FIG. 2, or launching an application to provide content may be the result of the selection of a channel designation number, for example, "channel 8" via a television remote control, keyboard, touch display, or other device for allowing the user to interact with the service offerings of the service provider 130.

At operation 315, a client application associated with the user's content viewing device 100, 110, 115, 120, 125 may launch a media player for allowing the selected content item to be streamed to the customer/subscriber's content viewing device, and at operation 320, the selected content is provided. For example, the user may desire to watch a favorite television show, and in response to selecting the desired television show from the programming guide 200, a client application on the user's set-top box 105 may launch a media player and may request the content to be streamed to the customer/subscriber through the set-top box 105 from a content repository, for example, a cable television service's head end associated with the service provider back end application server 160. As should be appreciated, at this point, the customer/subscriber may utilize the provided content in any manner provided for by the customer/subscriber's contractual relationship with the primary service provider. For example, the customer/subscriber may record the provided content at any of the acceptable recording locations, for example, his/her DVR device, at a cloud-based storage medium provided by the primary service provider 130, or on another storage device 155, for example, a storage device contained in association with or physically integrated with the customer/subscriber's receiving/viewing device 100, 110, 115, 120, 125.

At operation 325, a selection of a third party content item is received from a customer/subscriber via the programming guide 200 for requesting provision of a desired third party content item available to the customer/subscriber from a third party content provider, as described above with reference to FIGS. 1 and 2. For example, consider that a user is navigating a programming guide 200, illustrated in FIG. 2, and recognizes that a website in operation by a popular news service is available and includes video about a current news item that is of interest to the customer/subscriber. In response to a selection of the content channel provided in the programming guide 200 associated with the desired website, the customer/subscriber may selectively request that the video provided through the website be streamed from the third party service provider to the customer/subscriber via the primary service provider 130, as described above as referenced to FIG. 1.

At operation 330, authorizations, permissions and/or authentications associated with the customer/subscriber may be retrieved for the customer/subscriber to verify that the customer/subscriber may in fact request and receive the desired third party content. For example, a customer/subscriber profile database may be maintained in the service provider back end 160, as illustrated in FIG. 1, and as described further below with respect to FIG. 7, for maintaining information on each customer/subscriber. For example, for each customer/subscriber of the primary service provider 130, identification information, billing information, and other personally identifying information for properly establishing the customer/subscriber as a valid customer/subscriber of the servicer provider 130 may be maintained.

In addition, information identifying and describing each service offering available to a given customer/subscriber may be maintained. For example, one customer/subscriber may have a contractual relationship with the service provider 130 that provides only a very basic set of content offerings, for example, a basic channel package, that does not include content provision from third party service providers. Another customer/subscriber may have a contractual relationship with the primary service provider 130 that provides a more enhanced content viewing package providing basic content offering channels plus access to one or more third party service providers, for example, third party news services, third party sports services, third party business information services, and the like. Thus, at operation 330, when a customer/subscriber requests access to content from a given third party service provider, the profile information for the customer/subscriber may be parsed, and a determination may be made as to whether the requesting customer/subscriber is authorized to access and receive the requested third party content. As should be appreciated, in addition to checking a customer/subscriber profile database, an authentication user interface may be provided to request such authentication information as username and password, if such authentication is required by the primary service provider or by the third party service provider from which the content is desired. Such authentication may be required, for example, for overriding a parental control that may have been placed in association with the desired third party content item.

At operation 335, the service provider back end application server may query the central content/metadata collection point 165 for any additional information or metadata associated with the requested third party content, and the retrieved information may be used to correlate the retrieved information with other information maintained by the primary service provider for determining how to obtain the desired third party content item and whether the third party content item may be available from the primary service provider without the need for obtaining the desired content item from the third party service provider. For example, at operation 335, if the user has requested as a third party content item a vintage television show the user desires to record at a future date for a future viewing, metadata associated with the requested vintage television show may be retrieved, and an analysis may be performed to determine whether the requested vintage television show may be offered by the primary service provider at a time between the present time and the desired recording time such that the desired content item may be recorded from the primary service provider program offerings without the need for retrieving and recording the desired content item from the third party service provider. In addition, at operation 335, obtained metadata and other information for the desired content item may be utilized for displaying additional information in the programming guide 200, for example, additional information that may be of interest to the customer/subscriber with respect to viewing and/or recording the desired content such as the next available viewing time, the length of the content item, and the like.

At operation 340, a request is received at the service provider back end application server 160 for recording the selected third party content. As should be appreciated, the request for recording the selected content may come from selection of a record function 245, as illustrated above with respect to FIG. 2, or may come from selection of a record function when the third party content begins to play, or a record function may be selected for a third party content item to commence at a future date/time when the third party content item will be played. At operation 345, the back end application server may provide via the programming guide 200 a listing of recording options including a list of storage locations, for example, the DVR 140, the cloud-based storage medium 150, or other storage locations/devices, as described above. In addition, the storage options provided at operation 345 may include options to record the content item during play, or at a future time when the third party content item will be available. At operation 350, a request to record the desired third party content item to a selected storage location is received at the primary service provider back end application server 160 in response to a selection by the customer/subscriber.

At operation 355, a determination is made as to whether the desired third party content item is available from the primary service provider in addition to its availability from the third party service provider. As described above, if a review of the information obtained for the requested third party content item indicates that the requested content item is available from the customer/subscriber's primary service provider 130, then the requested content item may be recorded directly from the primary service provider without the need for obtaining the third party content item from a third party service provider. As should be appreciated, recording the content item from the primary service provider may be more efficient and less costly because use of resources associated with obtaining the content item from the third party content provider may be avoided. If the requested content item is available from the primary service provider, the method proceeds to operation 360, and the desired content item is recorded from the primary service provider to the designated storage location as described below with reference to FIG. 4.

Referring back to operation 355, if the content desired by the customer/subscriber is not available from the primary service provider, the method proceeds to operation 370, and a determination is made as to whether the customer/subscriber is authorized to record the desired third party content item. As should be appreciated, while the customer/subscriber may be authorized via his/her contractual relationship with the primary service provider and via its relationship with the third party service providers to obtain and view a given third party content item, the customer/subscriber may not be authorized to record the desired third party content item. As described above, the determination of whether the customer/subscriber is authorized to record the desired content item is determined by reviewing profile information for the customer/subscriber to determine whether the contractual relationship between the customer/subscriber and the primary service provider 130 allows for recording the desired third party content item. If the customer/subscriber is not authorized to record the desired third party content item, the method proceeds to operation 375, and the customer/subscriber is notified that he/she may not record the desired content item.

If the customer/subscriber is authorized to record the desired third party content item, the method proceeds to operation 380, and the third party content item is either passed from the third party CDN 180 to the primary service provider CDN 135 from which it is recorded to the desired storage location, or the third party content item is recorded from the third party CDN 180 to the desired storage location. As should be appreciated, the access of the third party content item may be made by any acceptable means for accessing IP based content, for example, by locating the content at a specific IP-based address via a uniform resource locator (URL) provided by the third party content provider for the accessed content item. Likewise, transport or streaming of the requested third party content item to the primary service provider CDN 135 and ultimately to the designated storage location is done according to well-known methods for streaming video content between to IP-based devices and/or storage systems. The method ends at operation 390.

Figure 4:
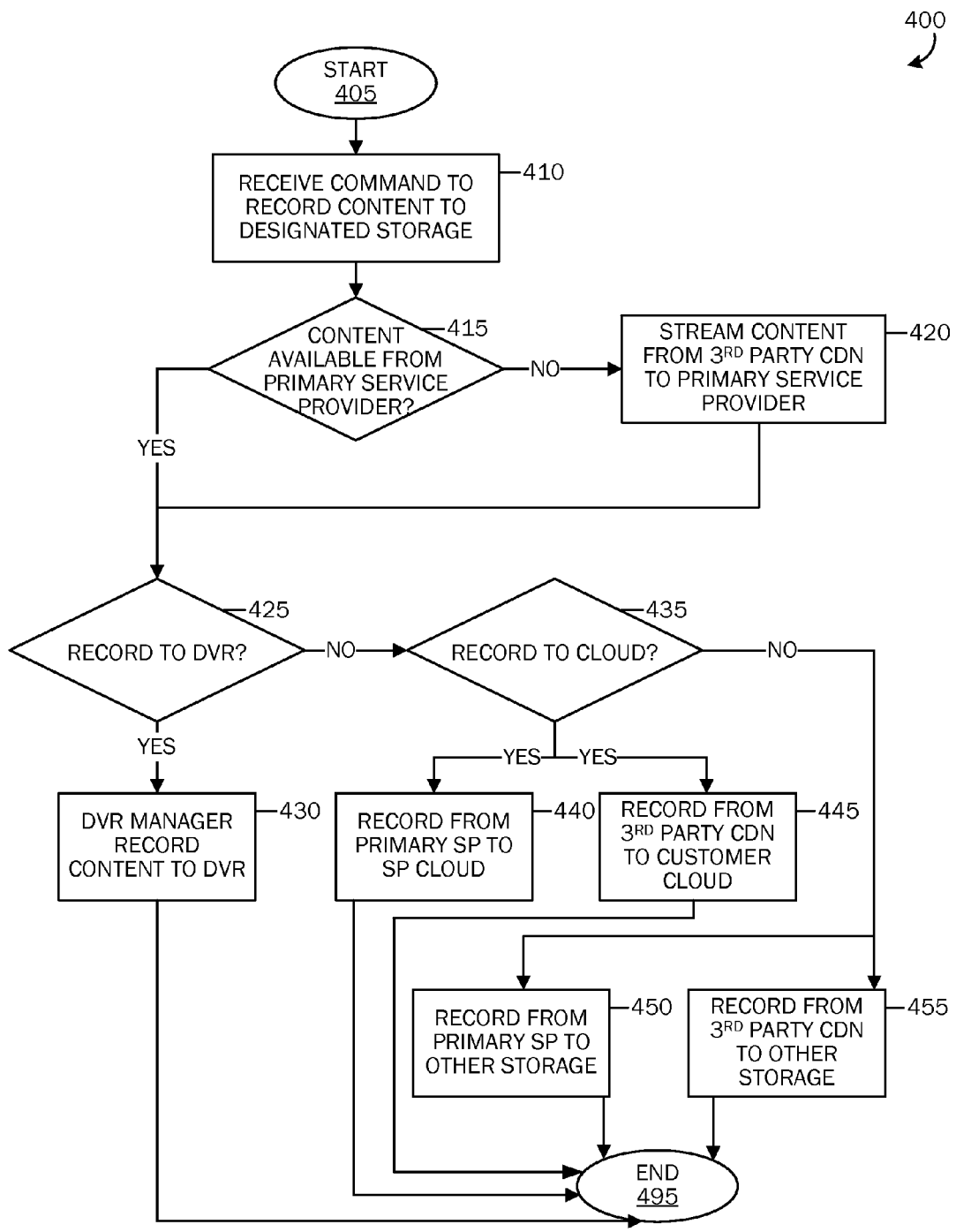
FIG. 4 is a flowchart illustrating a method for recording third party content to one or more storage systems of a primary service provider.

Having described a process flow for accessing and recording third party content with reference to FIG. 3, FIG. 4 is a flowchart illustrating a method for recording third party content to one or more storage systems of a primary service provider. The method 400 begins at start operation 405 and proceeds to operation 410 where a command is received at the primary service provider back end application server to record the desired third party content to a designated storage location, for example, the DVR 140, the cloud-based storage system 150, or another storage device 155.

At operation 415, a determination is made as to whether the desired third party content is available from the primary service provider as described above with reference to operation 355 of FIG. 3. If the desired third party content item is not available from the primary service provider 130, the method proceeds to operation 420 and the desired third party content item is streamed from the third party CDN 180 to the primary service provider CDN 135 as illustrated and described above with respect to FIG. 1. Whether the desired content comes from the primary service provider or from the third party service provider, the method proceeds to operation 425 and a determination is made as to where and how the third party content item is to be recorded.

The decision as to where the content should be recorded may be based on a decision by the customer/subscriber who is given options to select a storage location for the content. Alternatively, the customer/subscriber may have a profile preference set for recording content that designates the storage locations, for example, all recorded content will be stored at a cloud-based server. Alternatively, the DVR manager or another suitable application (e.g., at the back end application server 160) may monitor storage capacity at available storage locations, and the determination as to where to store a given content item may be based on capacity at the various locations.

At operation 425, a determination is made as to whether the requested content item is to be recorded to the digital video recording system 140. If yes, the method proceeds to operation 430, and the DVR manager 145 is instructed by the back end application server 160 to cause the content item to be streamed from the primary service provider CDN 135 to the DVR 140 via the DVR manager for storage as requested by the customer/subscriber. That is, the DVR manager may manage when the content is recorded to the DVR and whether any additional metadata should be associated with the recording as provided by the service provider 130 or as requested by the customer/subscriber.

Returning to operation 425, if the determination is made that the requested third party content item is not to be recorded on the customer/subscriber's DVR system, the method proceeds to operation 435, and a determination is made as to whether the requested content item is to be recorded to the cloud-based storage location 150. If yes, the method may proceed along one of two branches depending on where the third party content item is to be streamed from for recording. At operation 440, the desired third party content item may be recorded from the primary service provider CDN 135 to the cloud-based storage location 150. Alternatively, if the appropriate contractual relationship exists between the primary service provider 130 and the third party service provider 175, 185, 190 associated with the desired third party content item, then the desired content item may be recorded directly from the third party CDN 180 to the cloud-based storage location 150 at operation 445.

Referring back to operation 435 if a determination is made that the third party content item is not to be recorded to the cloud-based storage location 150 and that the item is to be recorded to some other designated storage location or device, for example, at a storage location located on the customer/subscriber's receiving and viewing device, for example, the customer/subscriber's tablet computing device 110, the operation proceeds to either operation 450 where the third party content item may be recorded from the primary service provider CDN 135 to the designated storage device/location, or the method may proceed to operation 455 where the content item may be recorded directly from the third party CDN 180 to the designated other storage device/location. According to an alternative embodiment, instead of recording the desired third party content item to a storage location associated with the primary service provider 130, as illustrated in FIG. 1, the third party content item may be streamed to and recorded at a storage location/device/system associated with the third party service provider from which the content item is retrieved.

According to an embodiment, after a content item from a third party service provider is recorded, as described above, information identifying the recorded content item may be provided in a list of recorded content items accessible by the customer/subscriber, and the recorded content item may be selected from the list for viewing as desired by the customer/subscriber in the same manner the customer/subscriber would view recorded items recorded directly from his/her primary service provider 130. Thus, in accordance with embodiments of the present invention, the customer/subscriber is able to obtain for viewing and recording content items made available from a variety of third party content providers in addition to those content items provided via his/her primary service provider. The method ends at operation 495.

Having described an exemplary operating system and process flows for embodiments of the invention above with reference to FIGS. 1-4, FIGS. 5-6A, 6B illustrate components of one or more computing systems that may be used in the various operating components described above, and FIG. 7 illustrates components of an example cable television services system with which audio/video content may be managed and provided for customers/subscribers. The illustrations and descriptions of these components are only examples of the vast numbers of computing systems and content management/delivery systems that may be employed for embodiments of the invention.

Figure 5:
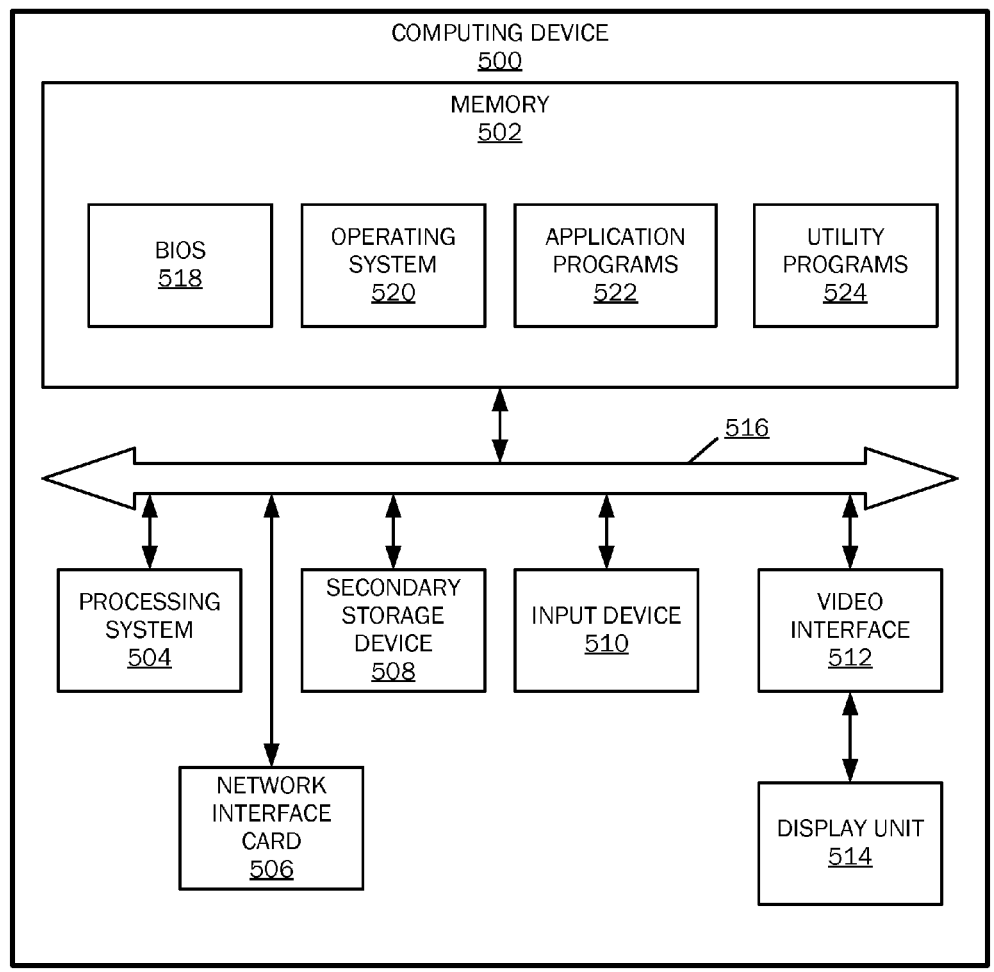
FIG. 5 is a simplified block diagram illustrating example physical components of a computing device with which embodiments may be practiced.

FIG. 5 is a block diagram illustrating example physical components of a computing device 500 with which embodiments may be practiced. Computing devices may be implemented in different ways in different embodiments. For instance, in the example of FIG. 5, the computing device includes a processing system 504, memory 502, a network interface 506, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules.

The memory 502 includes one or more computer-readable storage media capable of storing data and/or computer-executable instructions. According to one embodiment, one or more applications may be stored locally on computing device 500. Memory 502 thus may store the computer-executable instructions that, when executed by processor 504, share information via a virtual communication bus with other computing devices.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, applications. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

Figures 6A, 6B:
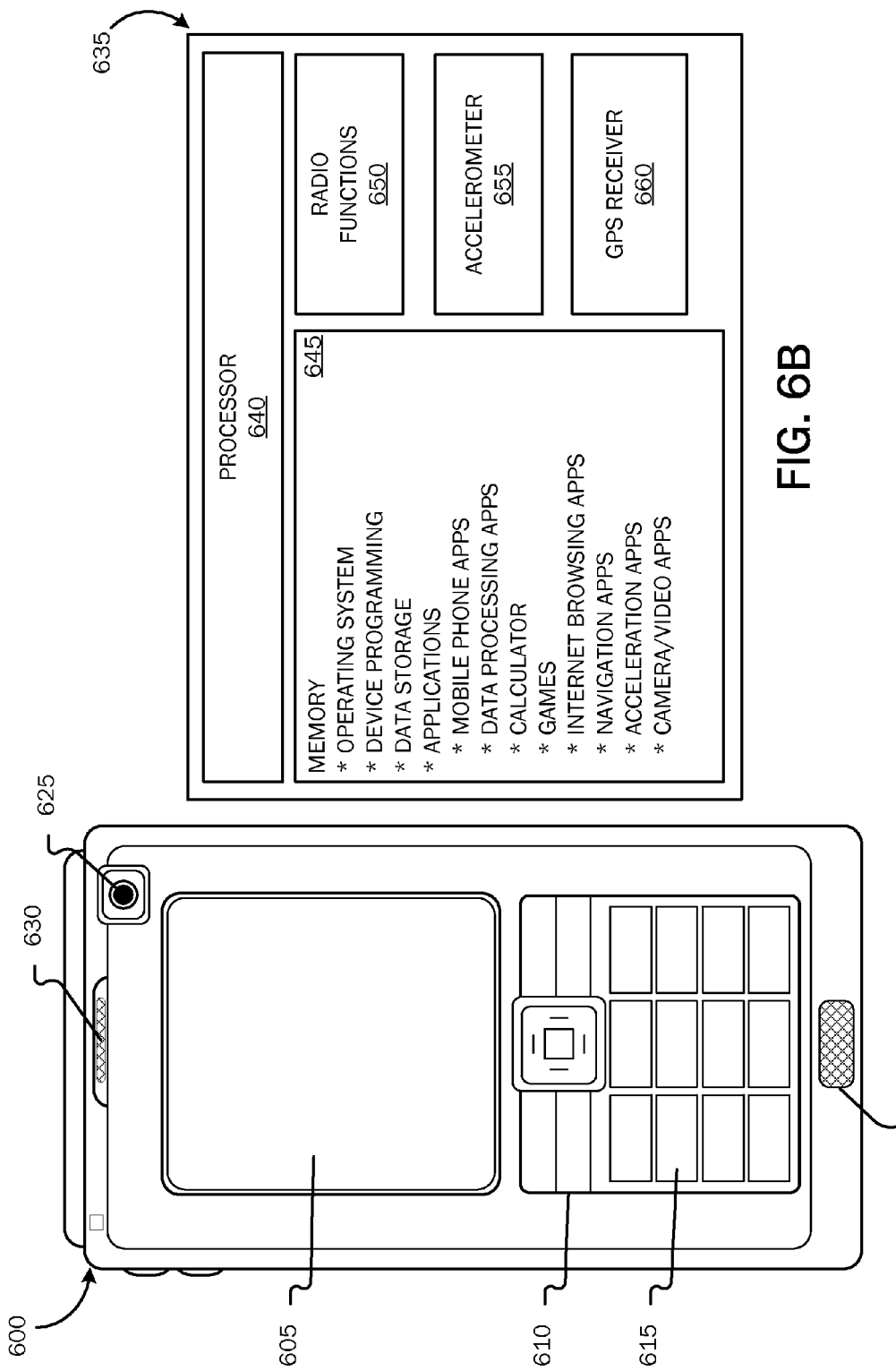
FIGS. 6A-6B illustrate a suitable mobile computing environment with which embodiments may be practiced.

FIGS. 6A-6B illustrate a suitable mobile computing environment, for example, a mobile computing device 600, a smart phone, a tablet personal computer, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 625 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of applications may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or WIFI-based positioning system to determine a device's 600 location.

Figure 7:
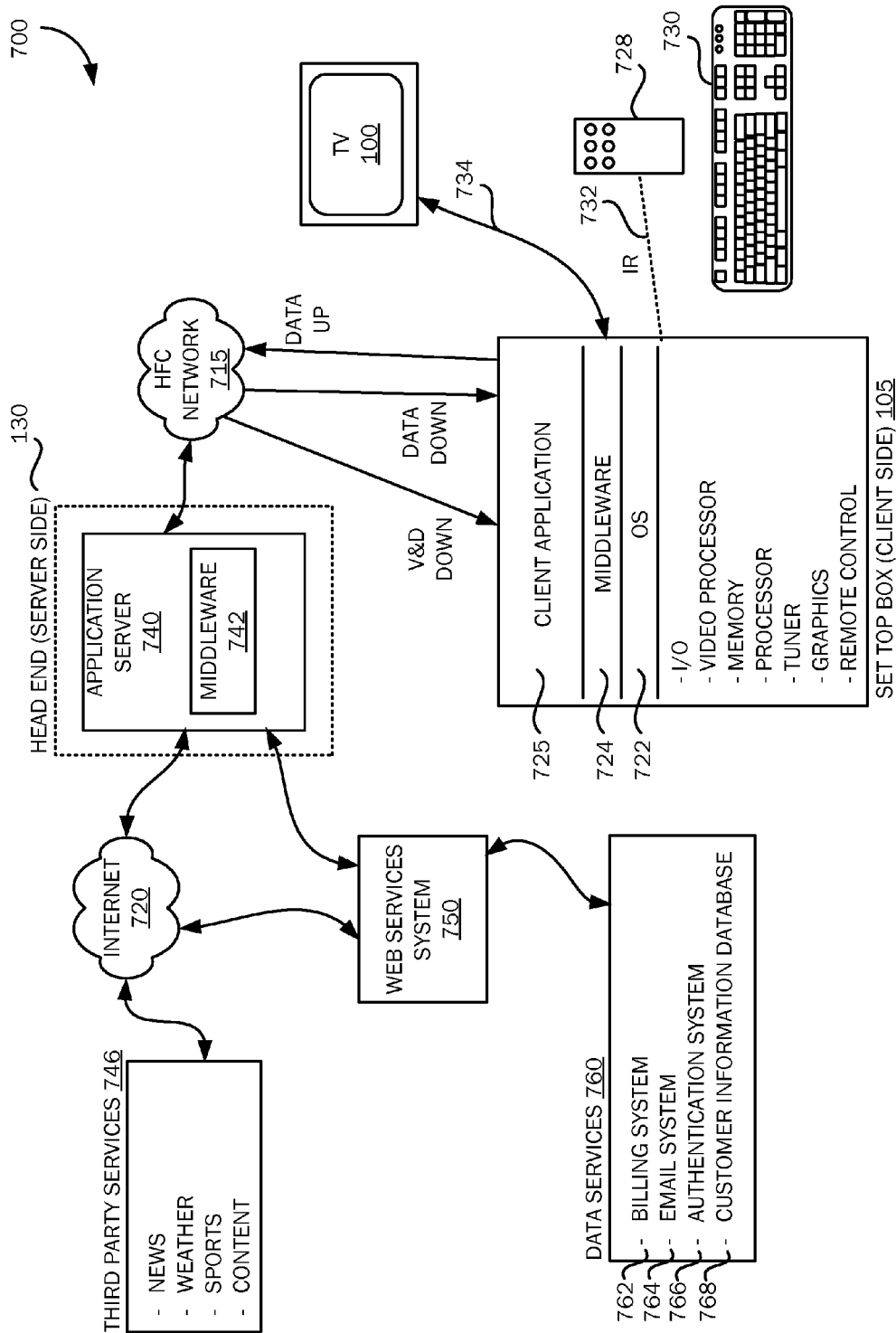
FIG. 7 is a simplified block diagram illustrating a cable television services system architecture providing an operating environment according to an embodiment.

FIG. 7 is a simplified block diagram illustrating a cable television services system 700 (hereafter referred to as "CATV") architecture providing an operating environment according to an embodiment. As can be appreciated, a CATV architecture is but one of various types of systems that may be utilized to provide recording of network-related content. For example, other systems such as satellite-based television services systems may be utilized for providing interaction between a customer/subscriber and third party content as set out above. Referring now to FIG. 7, digital and analog video programming, information content and interactive television services are provided via a hybrid fiber coax (HFC) network 715 to a television set 100 for consumption by a cable television/services system customer. As is known to those skilled in the art, HFC networks 715 combine both optical fiber and coaxial cable lines. Typically, optical fiber runs from the cable head end 130 to neighborhoods of subscribers. Coaxial cable runs from the optical fiber feeders to each customer or subscriber. The functionality of the HFC network 715 allows for efficient bidirectional data flow between the client-side set-top box 105 and a server-side application server 740 (also referred to as back end application server 160 in FIG. 1).

The CATV system 700 is in the form of a distributed client-server computing system for providing video and data flow across the HFC network 715 between server-side services providers (e.g., cable television/services providers) via a server-side head end 130 and a client-side customer via a client-side set-top box (STB) 105 functionally connected to a customer receiving device, such as the television set 100. As is understood by those skilled in the art, modern CATV systems 700 may provide a variety of services across the HFC network 715 including traditional digital and analog video programming, telephone services, high speed Internet access, video-on-demand, and information services.

On the client side of the CATV system 700, digital and analog video programming and digital and analog data are provided to the customer television set 100 via the set-top box (STB) 105. Interactive television services that allow a customer to input data to the CATV system 700 likewise are provided by the STB 105. As illustrated in FIG. 7, the STB 105 is a multipurpose computing device having a computer processor, memory, and an input/output mechanism. The input/output mechanism receives input from server-side processes via the HFC network 715 and from customers via input devices such as the remote control device 728, keyboard 730, or other computing device, such as a tablet/slate computer 110, smart phone 115, etc. The remote control device 728 and the keyboard 730 may communicate with the STB 105 via a suitable communication transport such as the infrared connection 732. The STB 105 also includes a video processor for processing and providing digital and analog video signaling to the television set 100 via a cable communication transport 734. A multi-channel tuner is provided for processing video and data to and from the STB 105 and the server-side head end system 130, described below.

The STB 105 also includes an operating system 722 for directing the functions of the STB 105 in conjunction with a variety of client applications 725. For example, if a client application 725 requires a news flash from a third-party news source to be displayed on the television 100, the operating system 722 may cause the graphics functionality and video processor of the STB 105, for example, to output the news flash to the television 100 at the direction of the client application 725 responsible for displaying news items. According to embodiments, the client applications 725 may include one or more applications suitable for coordinating third party content items to the television 100 and for locally storing third party content to a DVR storage capacity at the STB 105 in accordance with embodiments described above.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server and the client-side STB 105. The middleware layer 742 of the server-side application server and the middleware layer 724 of the client-side STB 105 may format data passed between the client side and server side according to the Extensible Markup Language (XML).

According to one embodiment, the set-top box 105 passes digital and analog video and data signaling to the television 100 via a one-way communication transport 734. According to other embodiments, two-way communication transports may be utilized, for example, via high definition multimedia (HDMI) ports. The STB 105 may receive video and data from the server side of the CATV system 700 via the HFC network 715 through a video/data downlink and data via a data downlink. The STB 105 may transmit data from the client side of the CATV system 700 to the server side of the CATV system 700 via the HFC network 715 via one data uplink. The video/data downlink is an "in band" downlink that allows for digital and analog video and data signaling from the server side of the CATV system 700 through the HFC network 715 to the set-top box 105 for use by the STB 105 and for distribution to the television set 100. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 715 and the set-top box 105 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 105 and the server-side application server 740 is typically passed through the "out of band" data links. Alternatively, an "in band" data carousel may be positioned in an "in band" channel into which a data feed may be processed from the server-side application server 740 through the HFC network 715 to the client-side STB 105. Operation of data transport between components of the CATV system 700, described with reference to FIG. 7, is well known to those skilled in the art.

Referring still to FIG. 7, the head end (also referred to as the back end 160 in FIG. 1) of the CATV system 700 is positioned on the server side of the CATV system and includes hardware and software systems responsible for originating and managing content for distributing through the HFC network 715 to client-side STBs 105 for presentation to customers via televisions 100. As described above, a number of services may be provided by the CATV system 700, including digital and analog video programming, interactive television services, telephone services, video-on-demand services, targeted advertising, and provision of information content.

The application server 740 is a general-purpose computing system operative to assemble and manage data sent to and received from the client-side set-top box 105 via the HFC network 715. As described above with reference to the set-top box 105, the application server 740 includes a middleware layer 742 for processing and preparing data from the head end of the CATV system 700 for receipt and use by the client-side set-top box 105. For example, the application server 740 via the middleware layer 742 may obtain data from third-party services 746 via the Internet 720 for transmitting to a customer through the HFC network 715 and the set-top box 105. For example, content metadata a third-party content provider service may be downloaded by the application server via the Internet 720. When the application server 740 receives the downloaded content metadata, the middleware layer 742 may be utilized to format the content metadata for receipt and use by the set-top box 105. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 105 through the HFC network 715 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 720 for provision to customers via the HFC network 715 and the set-top box 105.

According to embodiments, the application server 740 (160) obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. According to an embodiment, the customer information database 768 may also include profile information for customers/subscribers that include permissions and authentication information associated with or required for accessing and recording third party content as set out above. As should be understood, this information may be stored in a variety of disparate databases operated by the cable services provider.

Referring still to FIG. 7, web services system 750 is illustrated between the application server 740 and the data services 760. According to embodiments, web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 764, 766, 768 may be integrated or provided in any combination of separate systems, wherein FIG. 7 shows only one example.

Although described herein in combination with various computing devices, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for recording third party video content to a storage location associated with a primary video content service provider; comprising
receiving a request via the primary video content service provider for access to a third party content item;
receiving, at the primary video content service provider, information about the third party content item;
analyzing, at the primary video content service provider, the information about the third party content item to determine whether the primary video content service provider has a video content item matching the requested third party content item;
determining whether a requesting party is authorized to access the third party content item;
when it is determined that the requesting party is authorized to access the third party content item, providing access to the third party content item via the primary video content service provider;
receiving a request for recording the third party content item to the storage location associated with the primary video content service provider, wherein the storage location associated with the primary video content service provider is operated remotely from receiving devices associated with the requesting party;
receiving a command designating the storage location to record the third party content item, the designated storage location being identified by a user and selected from a plurality of available storage locations; and
streaming the third party content item to the designated storage location associated with the primary video content service provider for subsequent playback.

2. The method of claim 1, prior to streaming the third party content item to a designated storage location associated with the primary video content service provider for subsequent playback, further comprising:
storing the received information about the third party content item for identifying the third party content item to requesting parties.

3. The method of claim 2 further comprising:
if the primary video content service provider has the video content item matching the requested third party content item, then streaming the video content item matching the requested third party content item to the designated storage location instead of the third party content item.

4. The method of claim 3, wherein storing the received information about the third party content item includes correlating the information about the third party content item with programming information maintained by the primary video content service provider for generating descriptive information about the third party content item for identifying the third party content item to the requesting party.

5. The method of claim 4, wherein generating descriptive information about the third party content item includes applying one or more descriptive attributes to the information about the third party content item for enhancing selectivity of the third party content item by the requesting party.

6. The method of claim 5, wherein applying one or more descriptive attributes to the information about the third party content item includes applying one or more of:
title of the third party content item;
source of the third party content item;
availability time at which the third party content item is played; and
rating information for the third party content item.

7. The method of claim 6, further comprising:
providing a programming guide for listing one or more available video content items that may be selected by the requesting party for viewing; and
providing in the programming guide a listing of the generated descriptive information about the third party content item.

8. The method of claim 7, further comprising:
upon receiving a selection of the listing of the generated descriptive information about the third party content item in the programming guide, allowing navigation by the requesting party to the third party content item for allowing the requesting party to view the third party content item.

9. The method of claim 2, wherein receiving information about the third party content item includes receiving a link to the third party content item which when selected by the requesting party allows the requesting party to navigate to the third party content item via the primary video content service provider.

10. The method of claim 1, prior to streaming the third party content item to the designated storage location, determining whether a content item matching the requested third party content item is maintained by the primary video content service provider; and if the content item matching the requested third party content item is maintained by the primary video content service provider, streaming the matching content item to the designated storage location instead of the third party content item.

11. The method of claim 1,
wherein streaming the third party content item to the designated storage location associated with the primary video content service provider includes streaming the third party content item to a content delivery network component of the primary video content service provider; and
wherein streaming the third party content item to the designated storage location includes streaming the third party content item from the content delivery network component of the primary video content service provider.

12. The method of claim 1, wherein streaming the third party content item to a designated storage location includes streaming the third party content item to a digital video recording device accessible by the requesting party.

13. The method of claim 1, wherein streaming the third party content item to the designated storage location includes streaming the third party content item to a cloud-based storage system accessible by the requesting party.

14. The method of claim 1, wherein streaming the third party content item to the designated storage location includes streaming the third party content item to a designated storage location maintained by a third party from which the third party content item is received, wherein the storage location maintained by the third party is accessible by the requesting party for subsequent playback of the stored third party content item.

15. A system for recording third party video content to a storage location associated with a primary video content service provider, the system comprising:
a memory storage; and
a processing unit coupled to the memory storage, wherein the processing unit is operable to:
receive a request for access to a third party content item;
receive, at the primary video content service provider, information about the third party content item;
analyze, at the primary video content service provider, the information about the third party content item to determine whether the primary video content service provider has a video content item matching the requested third party content item;
determine whether a requesting party is authorized to access the third party content item;
provide access to the third party content item when the requesting party is authorized to access the third party content item;
receive a request for recording the third party content item to the storage location associated with the primary video content service provider, wherein the storage location associated with the primary video content service provider is operated remotely from receiving devices associated with the requesting party;

receive a command designating the storage location to record the third party content item, the designated storage location being identified by a user and selected from a plurality of available storage locations; and stream the third party content item to the designated storage location associated with the primary video content service provider for subsequent playback.

16. The system of claim 15, the processing unit being further operable to:

stream the video content item matching the requested third party content item to the designated storage location instead of the third party content item if the primary service provider maintains the video content item matching the requested third party content item.

17. The system of claim 16, the processing unit being further operable to:

provide a programming guide for listing one or more available video content items that may be selected by the requesting party for viewing; and providing in the programming guide a listing of descriptive information about the third party content item.

18. A computer readable storage device containing computer executable instructions which when executed by a computer perform a method for recording third party video content to a storage location associated with a primary video content service provider; comprising providing in a programming guide a listing of a generated descriptive information about a third party content item;

upon receiving a selection of the listing of the generated descriptive information about the third party content item in the programming guide, allowing navigation by a requesting party to the third party content item for allowing the requesting party to view the third party content item;

analyzing, at the primary video content service provider, the generated descriptive information about the third party content item to determine whether the primary video content service provider has a video content item matching the requested third party content item;

when the requesting party is authorized to access the third party content item, providing access to the third party content item via the primary video content service provider;

receiving a request designating the storage location associated with the primary video content service provider to record the third party content item to, the designated storage location being identified by a user and selected from a plurality of available storage locations, wherein the designated storage location associated with the primary video content service provider is operated remotely from receiving devices associated with the requesting party;

streaming the third party content item to the designated storage location for subsequent playback; and if the primary video content service provider has the video content item matching the requested third party content item, then streaming the video content item matching the requested third party content item to the designated storage location instead of the third party content item.

19. The computer readable storage device of claim 18, wherein streaming the third party content item to the designated storage location associated with the primary video content service provider includes streaming the third party content item to a content delivery network component of the primary video content service provider; and wherein streaming the third party content item to a designated storage location includes streaming the third party content item from the content delivery network component of the primary video content service provider.

20. The computer readable storage device of claim 18, wherein the programming guide provides identification of the third party and type of the third party content item.

* * * * *